G. R. Metten,
Treadle.
N° 82,860.          Patented Oct. 6, 1868.
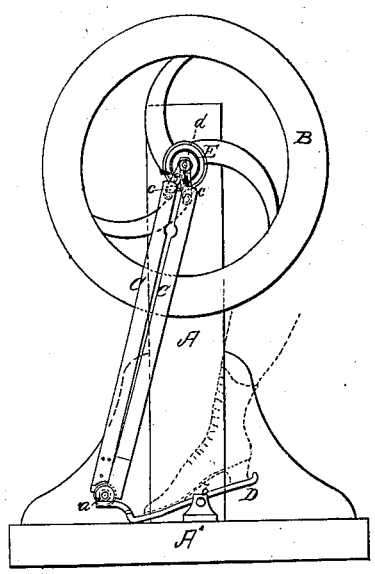
Fig 1
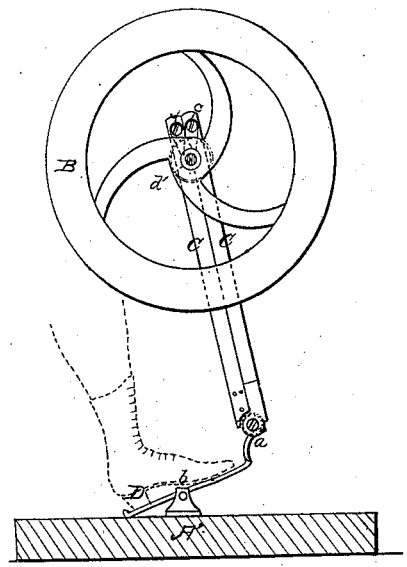
Fig 2.
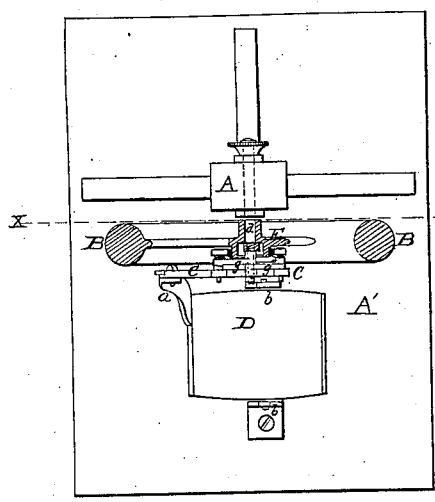
Fig 3
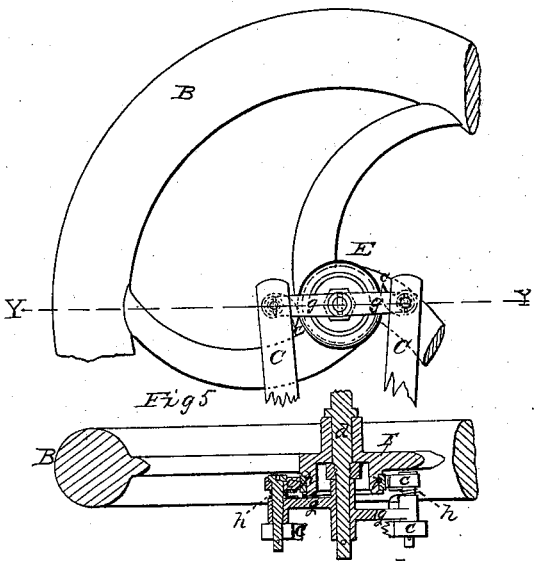
Fig 4
Fig 5
Witnesses
R. J. Campbell
J. N. Campbell
Inventor
Geo. R. Metten
By Attys Mason Fenwick & Lawrence

United States Patent Office.

GEORGE R. METTEN, OF CLEVELAND, OHIO.

Letters Patent No. 82,860, dated October 6, 1868.

---

IMPROVEMENT IN MECHANICAL MOVEMENT.

The Schedule referred to in these Letters Patent and making part of the same.

---

TO ALL WHOM IT MAY CONCERN:

Be it known that I, GEORGE R. METTEN, of Cleveland, in the county of Cuyahoga, and State of Ohio, have invented a new and useful Mechanical Movement; and I do hereby declare that the following is a full, clear, and exact description thereof, reference being had to the accompanying drawings, making a part of this specification, in which—

Figure 1 is an elevation of one side of the new mechanical movement.

Figure 2 is a view of the opposite side of the same, showing the movement in a position directly opposite to that represented in fig. 1.

Figure 3 is a top view of the movement.

Figures 4 and 5 are enlarged sectional views in detail.

Similar letters of reference indicate corresponding parts in the several figures.

This invention is chiefly applicable to sewing-machinery employing a treadle and balance-wheel for communicating motion to the sewing-mechanism, and it is designed to prevent noise and vibration of the machinery while in operation; at the same time, to allow of a continuous steady movement being imparted thereto.

The nature of my invention consists in communicating rotary motion to a balance-wheel by the vibration of a foot-stand or treadle, acting upon said wheel by the medium of vibrating pawl-carrying arms, said parts being so constructed and combined that the pawls shall operate alternately and noiselessly upon a friction-band, applied on the hub of the balance-wheel, and give two propelling impulses thereto at every vibration or double stroke of the treadle, as will be hereinafter explained.

To enable others skilled in the art to understand my invention, I will describe its construction, and operation.

In the accompanying drawings, B represents a balance-wheel, which is mounted upon a fixed horizontal shaft, $d$, so as to turn freely around this shaft, and A represents an upright standard or frame, made in any suitable manner adapted to the requirements of the case, which affords a support for said shaft and wheel, and to which the shaft may be clamped or confined in any suitable manner. For a sewing-machine, the standard A may constitute one of the legs or supports for the table upon which the sewing-mechanism is applied, and the shaft $d$ may be cast with such leg or standard.

The wheel B is constructed with a cylindrical flanged hub, E, on one side of it, adapted for receiving around its periphery a covering, $p$, of India rubber, cloth, leather, or other suitable substance, which will be slightly yielding, and which will afford a noiseless friction-surface. The flanges on this hub E, shown in figs. 3 and 5, form an annular groove or recess for receiving and keeping the band or covering $p$ in its place.

Upon the extended end of the shaft $d$, two short arms, $g\ g$, are applied, so as to vibrate freely through an arc of nearly one hundred and eighty degrees, in different planes. These arms are both of an equal length, and each one has pivoted to its free end a pawl, $c$, which is acted upon by a spring, $h$, that presses its rounded acting face against the surface of the friction-band $p$. One of these pawls $c$ is applied so as to act upon the hub of wheel B only when its arm $g$ is raised, and the other pawl acts upon said hub only when its arm is depressed. Thus, by vibrating the two arms simultaneously, they being on opposite sides of the axis of the hub E, the pawls $c\ c$ will give a continuous rotary motion to the wheel B in one direction.

The free ends of the two arms $g\ g$ are pivoted to the upper ends of two rods, C C, which rods extend downward, and are pivoted by a single pin, $a$, to an extension of a treadle, D, as clearly shown in the drawings. The treadle D is pivoted at $b\ b$ to supports, which are fastened to the bed A.'

It will be seen from the above description that the two connecting-rods C C operate to throw up and to depress the free ends of both pawl-carrying arms, $g\ g$, simultaneously, while the two pawls, $c\ c$, operate alternately upon the hub of wheel B, to turn this wheel in one direction. It will also be seen that both pawls operate as stops to prevent said wheel from turning backward, thus rendering the use of a separate back-stop unnecessary.

I do not claim, broadly, double-acting eccentrics or clutches adapted for acting directly upon the shaft of a fly-wheel, as I am aware that this is not new; nor is it new to employ a single treadle and two connecting-rods for operating such clutches and eccentrics. By my invention I provide for having double-acting pawls operate directly upon an anti-friction substance, $p$, applied around the hub of the fly-wheel.

Having described my invention, what I claim as new, and desire to secure by Letters Patent, is—

A balance-wheel, B, constructed with a flanged hub, having a friction-band, $p$, applied thereto, in combination with a treadle-motion and vibrating pawls $c$ $c$, arranged to operate substantially as described.

Witness my hand, in the matter of my invention of a mechanical movement for sewing and other machines worked by a treadle, this 7th day of August, 1868.

GEO. R. METTEN.

Witnesses:
 JULIUS HIRSCH,
 J. N. CAMPBELL.